(12) United States Patent
Blomster

(10) Patent No.: US 9,638,877 B2
(45) Date of Patent: May 2, 2017

(54) OPTOELECTRONIC ASSEMBLY

(71) Applicant: OPTOSKAND AB, Mölndal (SE)

(72) Inventor: Ola Blomster, Mölndal (SE)

(73) Assignee: OPTOSKAND AB, Molndal (SE)

(*) Notice: Subject to any disclaimer, the term of this patent is extended or adjusted under 35 U.S.C. 154(b) by 0 days.

(21) Appl. No.: 15/030,147

(22) PCT Filed: Sep. 3, 2014

(86) PCT No.: PCT/SE2014/051012
§ 371 (c)(1),
(2) Date: Apr. 18, 2016

(87) PCT Pub. No.: WO2015/057125
PCT Pub. Date: Apr. 23, 2015

(65) Prior Publication Data
US 2016/0259140 A1 Sep. 8, 2016

(30) Foreign Application Priority Data

Oct. 18, 2013 (SE) ...................................... 1330130

(51) Int. Cl.
*G02B 6/26* (2006.01)
*G02B 6/42* (2006.01)
(Continued)

(52) U.S. Cl.
CPC ........... *G02B 6/4285* (2013.01); *G02B 6/036* (2013.01); *G02B 6/3814* (2013.01);
(Continued)

(58) Field of Classification Search
CPC .... G02B 6/4285; G02B 6/036; G02B 6/3814; G02B 6/4214; G02B 6/4251; G02B 6/4272; G02B 6/4296; G02B 6/3845
(Continued)

(56) References Cited

U.S. PATENT DOCUMENTS 6,167,177 A * 12/2000 Sandstrom ............... G02B 6/14
385/100
7,309,175 B1 12/2007 Rosiewicz et al.
(Continued)

FOREIGN PATENT DOCUMENTS

CN 2412225 Y 12/2000
CN 2412226 Y 12/2000
(Continued)

OTHER PUBLICATIONS

PCT/ISA/210—International Search Report—Feb. 10, 2015 (Issued in Application No. PCT/SE2014/051012).
(Continued)

*Primary Examiner* — Ellen Kim
(74) *Attorney, Agent, or Firm* — Venable, LLP

(57) ABSTRACT

An optoelectronic assembly connectorizing light through an optical fiber. A housing includes an axially extending cavity. A transparent window is located at a first end of the cavity. A termination part is located at a second end of the cavity. The cavity forms a cooling chamber being fed by a flowing coolant surrounding an envelope surface of the optical fiber. The optical fiber is in optical contact with the window and extends out of the assembly through the termination part. The optical fiber is fixed in the termination part with a guiding glue.

19 Claims, 9 Drawing Sheets

(51) Int. Cl.
*G02B 6/38* (2006.01)
*G02B 6/036* (2006.01)

(52) U.S. Cl.
CPC ......... *G02B 6/4214* (2013.01); *G02B 6/4251* (2013.01); *G02B 6/4256* (2013.01); *G02B 6/4272* (2013.01); *G02B 6/4296* (2013.01); *G02B 6/3845* (2013.01)

(58) Field of Classification Search
USPC ............... 385/27, 29, 31, 39, 76, 84, 80, 78
See application file for complete search history.

(56) References Cited

U.S. PATENT DOCUMENTS

| | | | | |
|---|---|---|---|---|
| 7,349,596 | B2 * | 3/2008 | Anderegg | G02B 6/26 385/27 |
| 9,052,467 | B2 * | 6/2015 | Roos | G02B 6/3813 |
| 2006/0279950 | A1 | 12/2006 | Hama et al. | |
| 2009/0304336 | A1 | 12/2009 | Berger | |
| 2010/0210911 | A1 | 8/2010 | Shimotsu | |

FOREIGN PATENT DOCUMENTS

| | | |
|---|---|---|
| CN | 1880833 A | 12/2006 |
| CN | 101846765 A | 9/2010 |
| CN | 102902030 A | 1/2013 |
| DE | 102009025556 A1 | 12/2010 |
| EP | 0704728 A2 | 4/1996 |
| EP | 2479594 A1 | 7/2012 |
| WO | WO-2012167102 A1 | 12/2012 |
| WO | WO-2013095272 | 6/2013 |

OTHER PUBLICATIONS

PCT/ISA/237—Written Opinion of the International Searching Authority—Feb. 10, 2015 (Issued in Application No. PCT/SE2014/051012).

O. Blomster et al; "Superior power handling in optical fiber cables for multi-kW lasers"; SPIE LASE, International Society for optics and Photonics, Feb. 20, 2014, vol. 89630B1-89639B9.

* cited by examiner

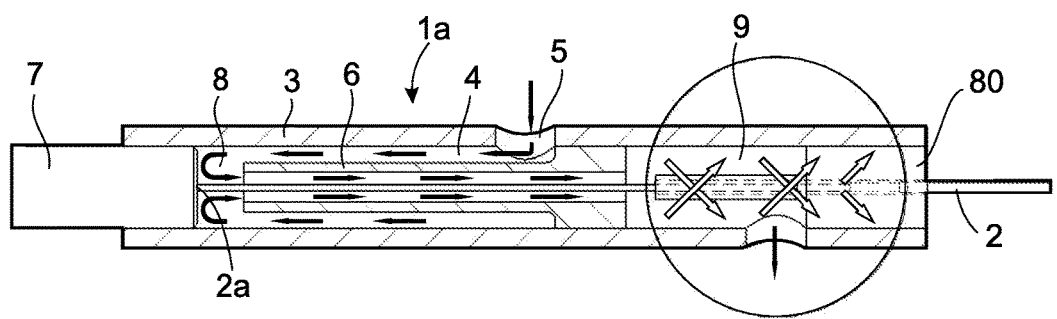
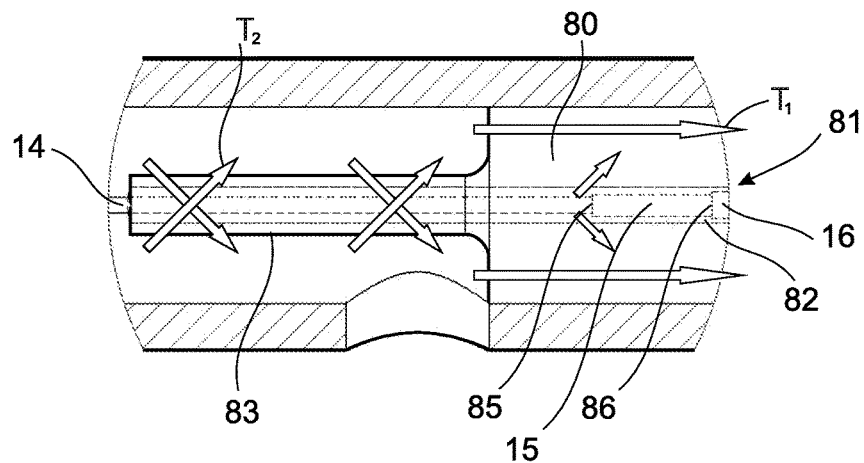
Fig.8a
Fig.8b

OPTOELECTRONIC ASSEMBLY

CROSS-REFERENCE TO RELATED APPLICATIONS

The application claims priority to Swedish patent application 1330130-4 filed 18 Oct. 2013 and is the national phase under 35 U.S.C. §371 of PCT/SE2014/051012 filed 3 Sept. 2014.

TECHNICAL FIELD

The present invention relates to an optoelectronic assembly connectorizing an optical fiber end precisely and securely to prevent damage to the fiber.

BACKGROUND ART

The present invention relates to an optoelectronic assembly for a high-power optical fiber cable, specifically an optical fiber cable made for transmitting power levels up to and exceeding 20 kW. Generally the optical fiber cable has an input end for an incident beam-light and an exit end where the beam-light is leaving the optical fiber. Optical fibers for transmitting high optical power are frequently used in industrial applications. Specifically they are used in cutting and welding operations by means of high-power laser radiation, but also in other industrial applications such as heating, detection or working operations in high-temperature environments this type of optical fibers can be used. By means of the optical fibers it is possible to design flexible manufacturing systems for transmitting the laser beam from the high power laser source to the work piece. An optical fiber typically has an inner glass core and a transparent, surrounding layer, a so-called cladding, which often is made of doped glass. The cladding has got a lower refractive index than the glass core. The function of the cladding is to keep the optical beam confined to the core. The core and cladding can be covered by protective buffer and jacket layers.

With the evolution of high power fiber and disc lasers with high brilliance the power handling capabilities of optical fibers have increased significantly. When designing optical fiber systems for high power laser radiation it is important that the fiber is efficient for transporting the light and to keep the high brilliance of light through the fiber. Working with the high power light from the lasers, the fiber must also stand this high power light during applications, which can give high back reflections back into the system. This put high demands on the design of optical fiber connectors to withstand high power laser light losses. Fibers are terminated in connectors that hold the fiber end precisely and securely to prevent damage to the fiber and fulfil plug and play demands. A fiber-optic connector is basically a rigid cylindrical barrel surrounded by a sleeve that holds the barrel in its mating socket. The mating mechanism can be, for instance, push-and-click, bayonet, or threaded. A typical connector is installed by preparing the fiber end by removing at least parts of the outer layer, clean the glass layer. In some cases a mode stripper is applied to the glass cladding either by chemical etch or by applying a material with higher refraction index than the cladding layer. As a termination in front a glass cylinder is attached to the fiber end. The fiber core and the glass cylinder are in optical contact to prevent losses and reflections in this point. The glass cylinder is coated for the specific wavelength the optical fiber connector is used for.

A problem with high power laser applications is that losses incurred within a connector due to light leaking out of the optical fiber will generate heat. During cutting and welding operations back reflected process light can cause substantial transmission losses in the reverse direction of the optical fiber and can also cause damage to the optical fiber and the connector. Hence, there is a need for an improved connector device, or optoelectronic assembly that is highly accurate and provides a solution that minimises losses. In case losses occur, the design of the optical fiber connector must handle optical losses without damages.

SUMMARY OF THE INVENTION

The above problems are solved by an optoelectronic assembly.

In the subsequent text, the term "light" is to be interpreted as light emitted by a laser, preferably, but not necessarily a high-power laser for industrial use. The term "optoelectronic assembly" is used to define a fiber connector including all component parts and accessories making up such an optoelectronic assembly.

The invention relates to an optoelectronic assembly connectorizing an optical fiber, which assembly comprises a housing with an axially extending cavity. The cavity has a first end, or input end, where light is transmitted into the optoelectronic assembly and a second end, or output end, where light is transmitted out of the optoelectronic assembly. According to one example, the housing comprises a transparent window located at the first end of the cavity, which window is in optical contact with the fiber. The window can comprise any suitable material dependent on the wavelength of the light to be transmitted. Examples of such materials are quartz, fused silica, glass, sapphire or other types of transparent glass materials which are commonly used for applications such as high-energy laser windows.

According to alternative example, the housing comprises a transparent disc located at a first end of the cavity, which disc comprises an aperture for the fiber. The disc can be made from the same materials as the transparent window described above. The fiber can be fixed to the disc by, for instance, fusing an outer layer of the fiber to the glass material of the disc. The fixing could be glue, but is not essential for the invention.

According to a further alternative example, the housing comprises a metal disc located at a first end of the cavity, which disc comprises an aperture for the fiber. The disc can be made from the same material as the housing, or from any other suitable metallic material. The fiber can be fixed to the disc by, for instance, gluing an outer layer of the fiber to the metallic material of the disc.

The housing further comprises a termination part with an opening for the optical fiber located at the second end of the cavity, which termination part is used for fixing the optical fiber in position in the assembly, typically with an adhesive. The termination part can function as a reflector, in which case it comprises a material having not only reflective properties but also good heat conducting properties, such as gold, copper or a copper alloy. Alternatively, the termination part can be made from a material that is transparent to laser light, such as glass, quartz, ceramics, etc.

In this context, an optical fiber is assumed to comprise a central core and one or more cladding layers comprising a suitable glass material. The optical fiber further comprises an outer jacket layer or a buffer layer with an outer jacket layer. If a single jacket layer is used, then this can typically comprise an acrylate material. If a buffer and a jacket layer are used, then the buffer layer can comprise silicone and the jacket layer can comprise nylon or fluorine based plastics such as Tefzel®. These materials are only examples of suitable materials making up an optical fiber.

The cavity in the housing forms a cooling chamber being fed by a flowing coolant surrounding the envelope surface of said optical fiber. The coolant can be water or any other suitable liquid. The coolant can be supplied at one end of the housing and be removed from the other end, or be supplied and removed from the same end. In at least the latter case, baffles or guides are provided surrounding the optical fiber throughout the cavity to control the flow rate and/or the flow direction of the coolant, in order to ensure sufficient cooling of desired areas and/or connector components making up the assembly. In the subsequent text, the terms "cavity" and "coolant chamber" are used to denote the same feature. Also, the term "first opening" is used to denote an inlet for coolant and "second opening" is used to denote an outlet for coolant. The optical fiber is in optical contact with said window and extends out of the assembly through the termination part. The optical fiber passes through and is fixed in a predetermined location in the termination part by a guiding glue.

The guiding glue has a lower refractive index than the optical fiber, which allows it to guide the beam of light in the optical fiber and to keep the light inside the cladding of said fiber. In general, it is desirable to keep the light within the core of the optical fiber, but leakage into the cladding may occur. Hence, the guiding glue should have a lower refractive index than the envelope surface that is in contact with the glue. The guiding glue is optically transparent or semi-transparent for the transmitted light wavelengths emitted by a laser. In this context, the envelope surface can be a jacket layer, a buffer layer or a cladding layer, whichever is the outer layer of the fiber in contact with the guiding glue.

The guiding glue is arranged to completely surround the optical fiber at least over the axial extension of the termination part, in order to form a coolant seal in the termination part. In addition to fixing the optical fiber in position in the termination part, the guiding glue is arranged to fix the optical fiber to keep it out of contact with the termination part along its axial extension. An end portion of the guiding glue can be exposed to the cooling chamber at the side of the termination part facing the cooling chamber and is cooled by direct contact with coolant.

The optical fiber comprises a core, at least one cladding layer and at least one jacket layer, wherein the jacket layer is terminated within the guiding glue coating the optical fiber. Alternatively, the optical fiber can also comprise at least one buffer layer in contact with the jacket layer. The buffer layer is terminated either within the guiding glue or outside the guiding glue a predetermined distance into the coolant chamber. The buffer layer can be made from an acrylate material, silicone, or a similar suitable material. The jacket layer is provided outside the buffer layer and can be made from a suitable plastic material, such as nylon or a fluorine based plastic material.

The exact design and composition of the optical fiber is not relevant to the invention per se. The relevant feature is the refractive index of the optical fiber, in particular the glass material (core and cladding) of the optical fiber, which decides the upper limit for the refractive index of the guiding glue. The glass material of the optical fiber includes the core and the cladding layer. Examples of refractive indices are 1.46 for fused silica or 1.41 for silicone at a wavelength of 1060 nm; the refractive indices are dependent on the wavelength of the transmitted light.

According to a first example, the buffer layer and the jacket layer are terminated within the guiding glue. According to a second example, the jacket layer is terminated within the guiding glue, while the buffer layer is terminated outside the guiding glue a predetermined distance inside the cooling chamber. According to a further example, the cladding layer extending throughout the cavity is surface treated over at least a part of its extension, to form a mode stripper.

The guiding glue can comprise any suitable adhesive material having the desired refractive index in relation to the optical fiber. Non-limiting examples of suitable materials are one or more of silicone, acrylic high-polymer, acrylate resin, and epoxy resin. The acrylic high-polymer can comprise a substance copolymerized by one or more of methyl acrylate, ethyl acrylate, and butyl acrylate. The epoxy resin can comprise one or more of radical epoxy resin, two-component epoxy resin, or double-cationic epoxy resin.

The guiding glue enclosing and coating the optical fiber is preferably located throughout a termination part, which forms an end wall of the housing. Alternatively, the guiding glue can also be at least partially located inside a hollow portion extending a predetermined distance from the surface of the termination part facing into the cooling chamber. The hollow portion is preferably, but not necessarily, an integral part of the termination part. The hollow portion can, for instance, be cylindrical or have any suitable cross-section that enhances heat transmission, such as radial flanges.

According to a further example, at least the hollow portion is a reflector extending from the termination part into the cooling chamber. The hollow reflector comprises a material having not only reflective properties but also good heat conducting properties, such as gold, copper or a copper alloy, in order to transfer heat to the coolant and to avoid heating of the glue and the surrounding components. An end portion of the guiding glue is exposed to the cooling chamber at the end of the hollow portion and is cooled by direct contact with coolant. The termination part itself can also be arranged to act as a reflector and can be made from the same or a similar material as the hollow portion. The reflector designs described above avoids heating of the guiding glue from light that has leaked out into the coolant cavity. The reflectivity of the reflector surface is high not to absorb any laser light. The use of a heat conducting material allows the glue to be efficiently cooled when it is exposed to heat generated from the termination of the optical fiber.

According to a further example, a sealing can be provided at the end surface of the guiding glue and surrounding the outer surface of the optical fiber. For instance, a circular sealing can extend radially between the optical fiber and the termination part is located between the guiding glue and the cooling chamber. The sealing can be placed around the optical fiber where it enters the termination part or where it enters the hollow reflector. In this way, the sealing prevents coolant from reaching of the guiding glue surrounding the optical fiber and assists in sealing the housing. The termination part itself can also be arranged to act as a reflector. Suitable materials for such reflectors comprises materials that not only have good reflective but also good heat conducting properties, such as gold, copper or a copper alloy, in order to reflect and/or transfer heat to the coolant and avoid heating of the glue.

According to a further example, at least the hollow portion comprises a suitable transparent material, such as glass, quartz or similar. In this way, light leaving the optical fiber can be transmitted to the coolant through the hollow portion. If the termination part also comprises a transparent material, light can be transmitted through this part. The termination part is also in contact with and cooled by the coolant. As in the first example above, an end portion of the guiding glue is exposed to the cooling chamber at the end of the hollow portion and is cooled by direct contact with coolant.

The design described above could also be combined with a mode stripper to avoid cladding modes. A cladding mode is a mode that is confined to the cladding of an optical fiber by virtue of the fact that the cladding has a higher refractive index than the surrounding medium. These modes are generally undesired. Cladding modes are suppressed by surface roughening of the cladding surface that will scatter the light as it strikes the interface, by increasing the scattering at the cladding interface to extract the cladding modes, or by surrounding a portion of the fiber with a material whose index of refraction matches or is higher than that of the cladding, causing the cladding light to transmit into the index-matching material. These latter techniques are called mode stripping. A portion of an outermost cladding layer extending through the cavity between the window and the termination part, as described above, can be provided with such a mode stripper, for instance in the form of a surface roughening.

In a first case, where the buffer layer is terminated within the guiding glue, light still remaining in the cladding after the mode stripper will be guided first by the coolant, then by the guiding glue and finally by the buffer material. In a second case, where the buffer layer is terminated outside the guiding glue, inside the cavity, light still remaining in the cladding after the mode stripper will be guided first by the coolant and then by the buffer material.

BRIEF DESCRIPTION OF DRAWINGS

In the following text, the invention will be described in detail with reference to the attached drawings. These schematic drawings are used for illustration only and do not in any way limit the scope of the invention. In the drawings:

FIG. 8A shows a schematic cross-section of an optoelectronic assembly according to a eight embodiment of the invention; and FIG. 8B shows a partial enlargement of the assembly in FIG. 8A;

EMBODIMENTS OF THE INVENTION

Figure 1A:
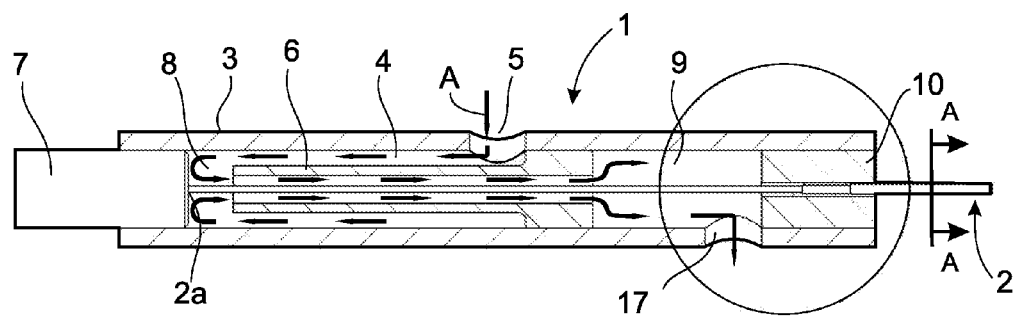
FIG. 1A shows a schematic cross-section of an optoelectronic assembly according to a first embodiment of the invention.

FIG. 1A shows a schematic cross-section of an optoelectronic assembly 1 according to the invention. This figure illustrates the general principle of the invention, wherein the subsequent figures will show alternative embodiments. The optoelectronic assembly, hereafter termed "assembly", is mounted on or fixed relative to a device for receiving light from an input fiber or a laser.

FIG. 1A shows a schematic cross-section of an optoelectronic assembly 1 according to a first embodiment of the invention. The optoelectronic assembly 1, hereafter termed assembly 1, is arranged for transmitting light from a source of coherent light, such as a laser (not shown), through an optical fiber 2 towards a further device (not shown). The assembly 1 comprises a housing 3 with an axially extending cavity 4. The cavity 4 in the housing 3 forms a cooling chamber connected to a supply (not shown) of a flowing coolant surrounding the envelope surface of said optical fiber 2. The coolant can be water or any other suitable liquid. In this example, the coolant is supplied through a first opening 5 and removed from a second opening 17 at the same end of the cavity 4. In at least the latter case, baffles 6 are provided surrounding the optical fiber throughout the cavity 4 to control the flow rate and/or the flow direction of the coolant, in order to ensure sufficient cooling of desired areas and/or connector components making up the assembly. In FIG. 1A the direction of flow of the coolant is indicated by arrows A. The coolant enters the first opening 5 and is guided by the baffle 6 through an annular space between the housing 3 and the outer surface of the baffle 6 from the second end 9 of the cavity 4 towards the first end 8. At the first end 8 the coolant is guided into an annular space between the inner surface of the baffle 6 and the optical fiber 2 towards the second end 9, where a radial flange separates the annular spaces and allows the coolant to be drained through the second opening 17. Alternatively, the coolant can be supplied at one end of the housing and be removed from the other end.

The housing 3 comprises a transparent window 7 located at a first end 8 of the cavity, which window 7 comprises a material adapted to the wavelength of the light to be transmitted. Examples of suitable materials are quartz, fused silica, transparent ceramics, glass and sapphire, which are commonly used for applications such as high-energy laser windows. In FIG. 1A, incoming light is focussed onto the end of the optical fiber 2 through the window 7. The housing 3 further comprises a termination part 10, with an opening 11 (see FIG. 1B) for the optical fiber 2, located at a second end 9 of the cavity 4. The termination part 10 is used for fixing the optical fiber 2 in position in the assembly 1.

The end 2a of the optical fiber 2 is in optical contact with said window 7 and extends out of the assembly 1 through the opening 11 in the termination part 10. The optical fiber 2 passes through the opening 11 and is fixed in a predetermined location in the termination part 10 by a guiding glue 12 (see FIG. 1B).

The guiding glue 12 has a lower refractive index than the optical fiber 2, which allows it to guide the beam of light in the optical fiber 2 and to keep stray light inside the cladding of said fiber 2. The guiding glue 12 is optically semi-transparent to the transmitted light wavelengths emitted by the light source or laser.

Figure 1B:
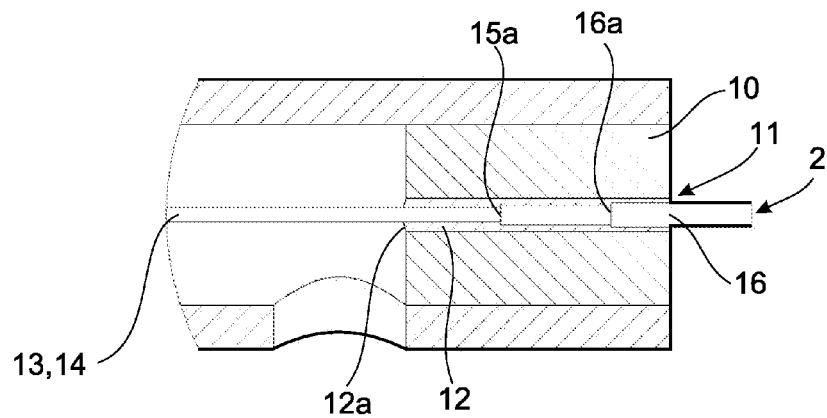
FIG. 1B shows a partial enlargement of the assembly in FIG. 1A.

The guiding glue 12 is arranged to completely surround the optical fiber 2 at least over the axial extension of the termination part 10, forming a coolant seal in the termination part 10. In addition to fixing the optical fiber 2 in position in the termination part 10, the guiding glue 12 is arranged to keep the optical fiber 2 out of contact with the termination part 10 along its axial extension. FIG. 1B shows a partial enlargement of the assembly 1 in FIG. 1A. In FIG. 1B it can be seen that an end portion 12a of the guiding glue 12 is exposed to coolant in the cavity 4 at the side of the termination part 10 facing the cavity 4 and is cooled by direct contact with coolant.

Figure 1C:
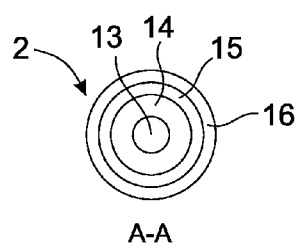
FIG. 1C shows an example of an optical fiber for use in an assembly according to the invention.

According to the examples described in this text, the optical fiber 2 shown in FIG. 1C comprises at least a core 13, a cladding layer 14, a buffer layer 15 and an outer jacket layer 16. FIG. 1B shows that the buffer layer 15 and the jacket layer 16 are terminated at separated termination points 15a, 16a within the guiding glue 12 coating the optical fiber 2. The cladding layer 14 surrounding the core 13 extends up to the window 7. Note that the relative thickness of these layers in relation to the core is not drawn to scale. In this example the core 13 and the cladding layer 14 are made from a glass material. The buffer layer 15 can be made from an acrylate material, silicone, or a similar suitable material. The jacket layer 16 is provided outside the buffer layer and can be made from a suitable a plastic material, such as nylon. The exact design and composition of the optical fiber is not relevant to the invention per se and alternative optical fibers can be used within the scope of the invention. For instance, in the example shown in FIG. 1C, the buffer layer could be eliminated, or more than one cladding layer or jacket layer could be used. The relevant feature is the refractive index of the glass material (core and cladding) of the optical fiber, which decides the upper limit for the refractive index of the guiding glue.

Figure 2A:
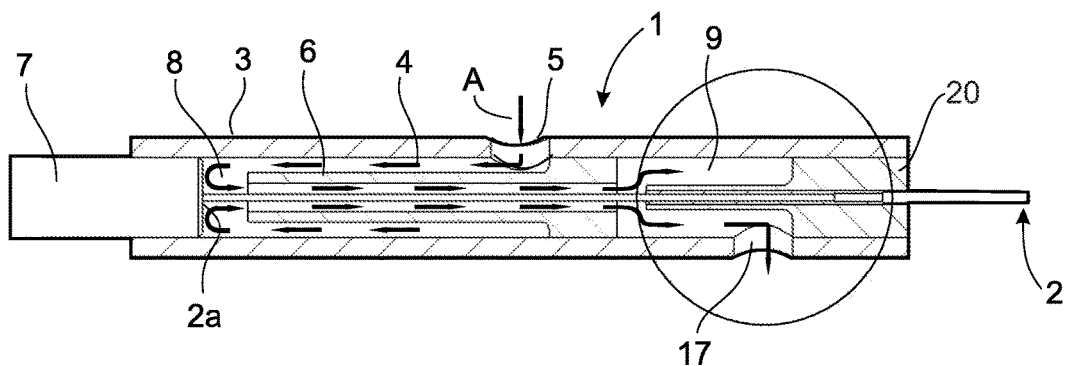
FIG. 2A shows a schematic cross-section of an optoelectronic assembly according to a second embodiment of the invention.

FIG. 2A shows a schematic cross-section of an optoelectronic assembly 1 according to a second embodiment of the invention. The optoelectronic assembly, hereafter termed assembly 1, is substantially identical to the assembly 1 in FIG. 1A. Corresponding component parts, which for all intents and purposes are the same, will retain the reference numerals previously used in FIGS. 1A and 1C (cf. numerals 1-9, 13-17).

Consequently, FIG. 2A shows an assembly 1 comprising a housing 3 with an axially extending cavity 4. The cavity 4 in the housing 3 forms a cooling chamber connected to a supply (not shown) of a flowing coolant surrounding the envelope surface of an optical fiber 2. The coolant can be water or any other suitable liquid. In this example, the coolant is supplied through a first opening 5 and removed from a second opening 17 at the same end of the cavity 4. In at least the latter case, baffles 6 are provided surrounding the optical fiber throughout the cavity 4 to control the flow rate and/or the flow direction of the coolant, in order to ensure sufficient cooling of desired areas and/or connector components. In FIG. 2A the direction of flow of the coolant is indicated by arrows A. The coolant enters the first opening 5 and is guided by the baffle 6 through an annular space between the housing 3 and the outer surface of the baffle 6 from the second end 9 of the cavity 4 towards the first end 8. At the first end 8 the coolant is guided into an annular space between the inner surface of the baffle 6 and the optical fiber 2 towards the second end 9, where a radial flange separates the annular spaces and allows the coolant to be drained through the second opening 17. The housing 3 comprises a transparent window 7 located at a first end 8 of the cavity, which window 7 comprises a material adapted to the wavelength of the light to be transmitted.

Figure 2B:
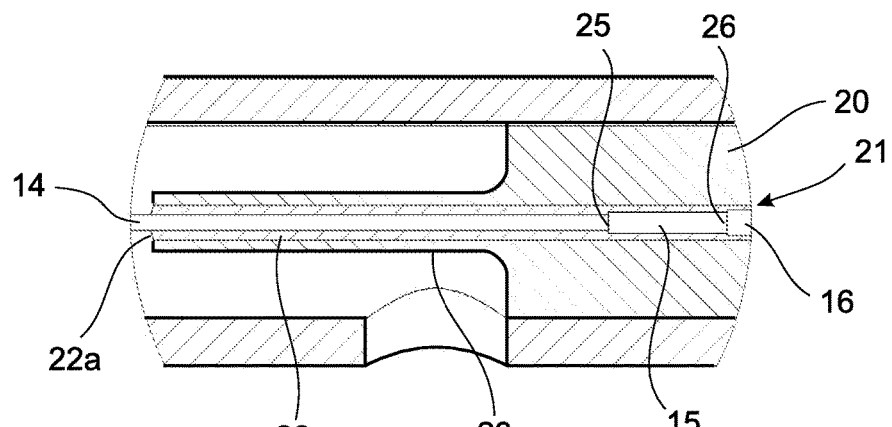
FIG. 2B shows a partial enlargement of the assembly in FIG. 2A.

The end 2a of the optical fiber 2 is in optical contact with said window 7 and extends out of the assembly 1 through a termination part 20, as indicated in FIG. 2B which shows a partial enlargement of the assembly in FIG. 2A. The optical fiber 2 passes through and is fixed in a predetermined location in the termination part 20 by a guiding glue 22.

The housing 3 further comprises a termination part 20 with an opening 21 for the optical fiber 2 located at a second end 9 of the cavity 4, which termination part 20 is used for fixing the optical fiber 2 in position in the assembly 1. The guiding glue enclosing and coating the optical fiber can be located throughout a termination part in the form of an end wall of the housing. In this example it is also located inside a hollow portion 23 extending a predetermined distance from the surface of the termination part 20 facing into the cavity 4. In the subsequent text, the hollow portion will be described as a cylindrical portion 23, although alternative cross-sectional shapes can be selected within the scope of the invention. The cylindrical portion 23 shown in FIG. 2B is an integral part of the termination part 20, but it can also form a separate component fixed to the termination part. The guiding glue 22 encloses and coats the optical fiber 2 throughout the cylindrical portion 23.

As described in connection with FIGS. 1A and 1B above, the guiding glue 22 has a lower refractive index than the optical fiber 2, which allows it to guide the beam of light in the optical fiber 2 and to keep the light inside the cladding of said fiber 2. The guiding glue 22 is optically transparent or semi-transparent for the transmitted light wavelengths emitted by the light source or laser.

The guiding glue 22 is arranged to completely surround the optical fiber 2 at least over the axial extension of the termination part 20, in order to form a coolant seal in the termination part 20. In addition to fixing the optical fiber 2 in position in the termination part 20, the guiding glue 22 is arranged to fix the optical fiber 2 to keep it out of contact with the termination part 20 and the cylindrical portion 23 along their axial extension. An end portion 22a of the guiding glue 22 is exposed to the cavity 4 at the end of the cylindrical portion 23 on side of termination part 20 facing the cavity 4 and is cooled by direct contact with coolant.

As indicated in FIG. 1C above, the optical fiber 2 comprises at least a core 13, a cladding layer 14, a buffer layer 15 and an outer jacket layer 16. As schematically indicated in FIG. 2B, the buffer layer 15 and the jacket layer 16 are terminated at separated termination points 25, 26, respectively, within the guiding glue 22 coating the optical fiber 2. The cladding layer 14 surrounding the core extends up to the window 7. The core 13 and the cladding layer 14 can be made from a glass material. The buffer layer 15 can be made from an acrylate material, silicone, or a similar suitable material. The jacket layer 16 provided outside the buffer layer can be made from a suitable a plastic material, such as nylon. The exact design and composition of the optical fiber is not relevant to the invention per se. The relevant feature is the refractive index of the optical fiber, in particular the glass material of the optical fiber, which decides the upper limit for the refractive index of the guiding glue.

Figure 3A:
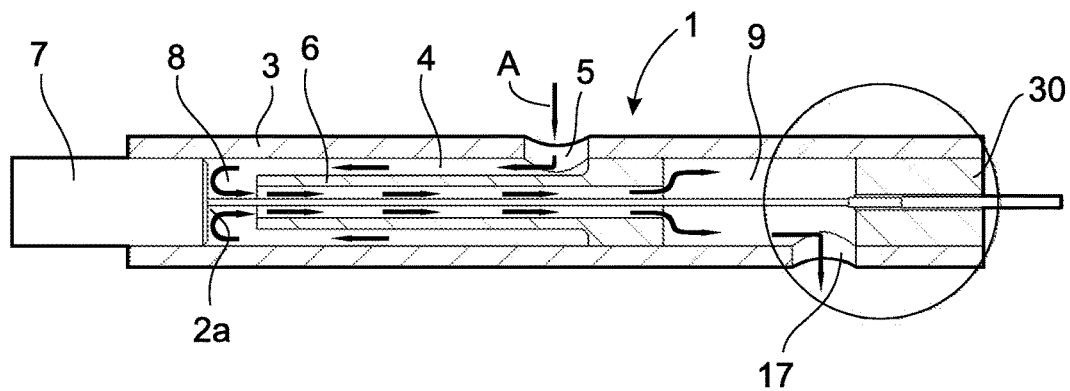
FIG. 3A shows a schematic cross-section of an optoelectronic assembly according to a third embodiment of the invention.

FIG. 3A shows a schematic cross-section of an optoelectronic assembly according to a third embodiment of the invention. This embodiment is substantially identical to that shown in FIG. 1A. Corresponding component parts, which for all intents and purposes are the same, will also retain the reference numerals previously used in FIGS. 1A and 1C (cf. numerals 1-9, 13-17).

Figure 3B:
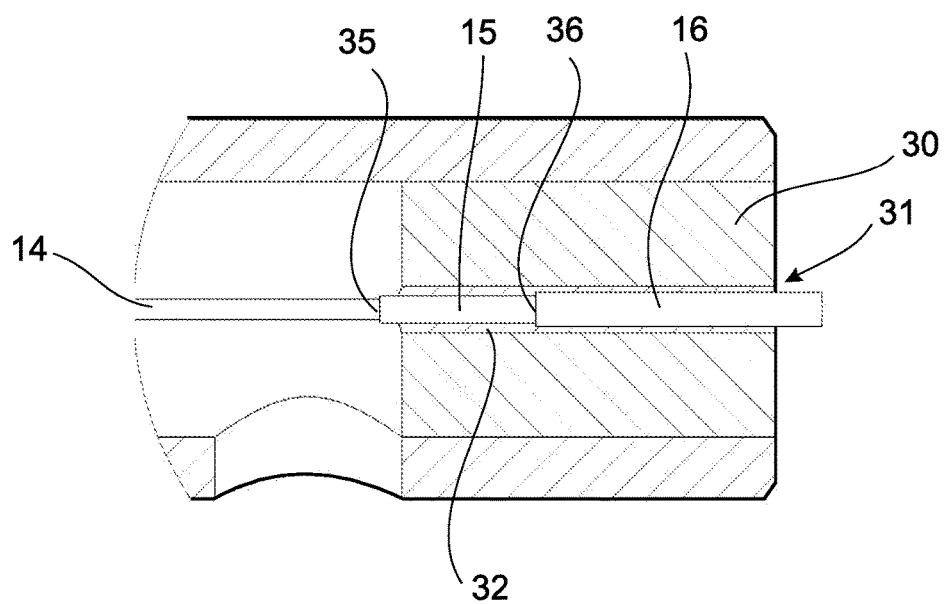
FIG. 3B shows a partial enlargement of the assembly in FIG. 3A.

The embodiment of FIG. 3A differs from that of FIG. 1A in the termination of the optical fiber 2. The optical fiber 2 comprises at least a core 13, a cladding layer 14, a buffer layer 15 and an outer jacket layer 16, as schematically indicated in FIG. 1A. The optical fiber 2 passes through and is fixed in a predetermined location in an opening 31 in a termination part 30 by a guiding glue 32, as indicated in FIG. 3B which shows a partial enlargement of the assembly in FIG. 3A.

In this example the jacket layer 16 is terminated at a first termination point 36 within the guiding glue 32, while the buffer layer 15 is terminated at a second termination point 35 outside the guiding glue 32 a predetermined distance inside the cooling chamber cavity 4. The cladding layer 14 surrounding the core extends up to the window 7.

Figure 4A:
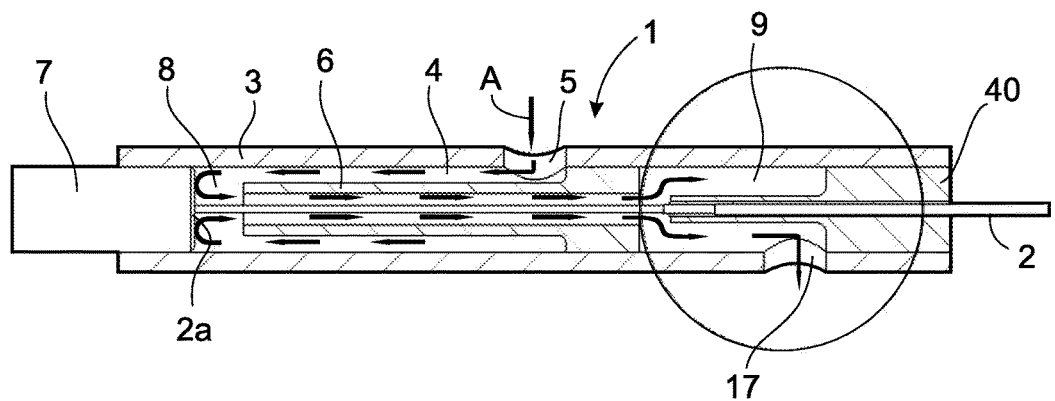
FIG. 4A shows a schematic cross-section of an optoelectronic assembly according to a fourth embodiment of the invention.

FIG. 4A shows a schematic cross-section of an optoelectronic assembly according to a fourth embodiment of the invention. This embodiment is substantially identical to that shown in FIG. 2A, wherein the termination part comprises a cylindrical portion extending into the cavity. Corresponding component parts, which for all intents and purposes are the same, will also retain the reference numerals previously used in FIGS. 1A and 1C (cf. numerals 1-9, 13-17).

Figure 4B:
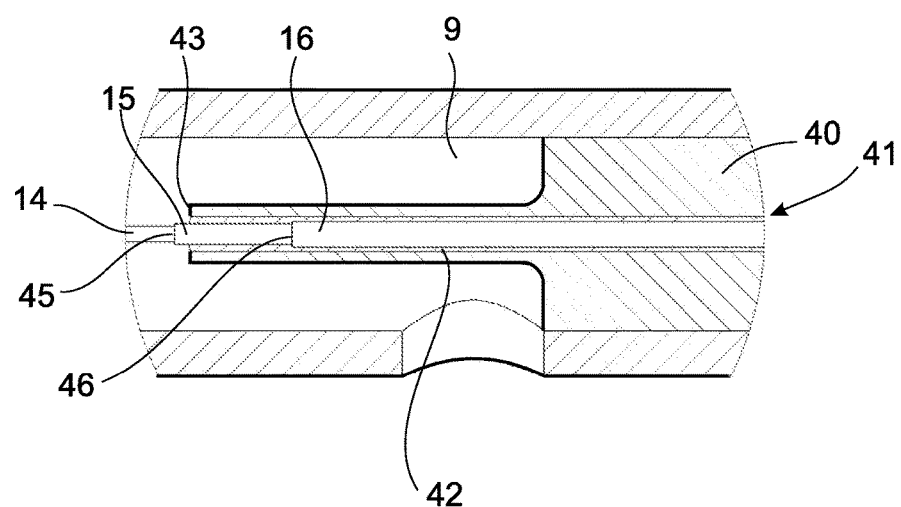
FIG. 4B shows a partial enlargement of the assembly in FIG. 4A.

The embodiment of FIG. 4A differs from that of FIG. 2A in the termination of the optical fiber 2. The optical fiber 2 comprises at least a core 13, a cladding layer 14, a buffer layer 15 and an outer jacket layer 16, as schematically indicated in FIG. 1C. FIG. 4B shows a partial enlargement of the assembly in FIG. 4A. The optical fiber 2 passes through an opening 41 in a termination part 40 and a cylindrical portion 43 extending a predetermined distance from the surface of the termination part 40 facing into the cavity 4. The optical fiber 2 is fixed in a predetermined location in the termination part 40 and the cylindrical portion 43 by a guiding glue 42.

In this example the jacket layer 16 is terminated at a first termination point 46 within the guiding glue 42, while the buffer layer 15 is terminated at a second termination point 45 outside the guiding glue 42 a predetermined distance inside the cooling chamber cavity 4. This arrangement prevents heating of the guiding glue 42 within the termination part 40 and the cylindrical portion 43, Light that leaks out of the cladding will pass into the coolant cavity 4, before reaching the termination part 40 and the cylindrical portion 43. Light remaining in the cladding layer 14 will be guided first by the coolant and then by the buffer layer 15. The cladding layer 14 surrounding the core extends up to the window 7.

Figure 5A:
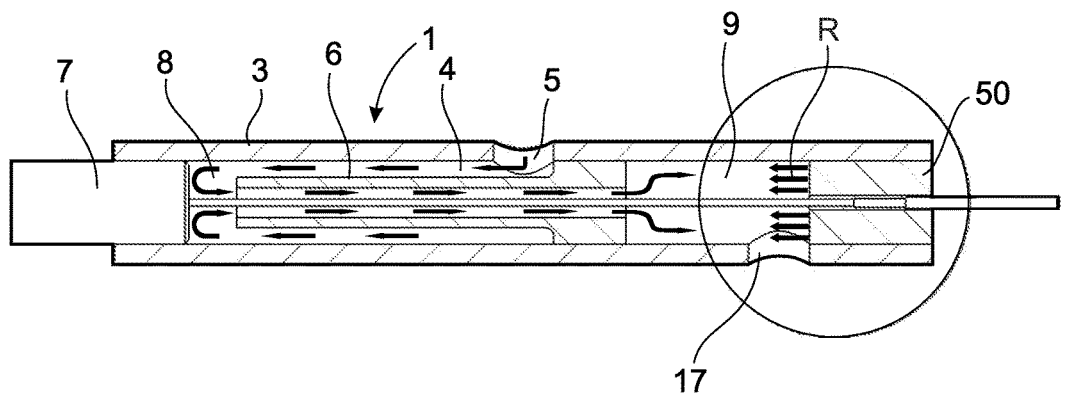
FIG. 5A shows a schematic cross-section of an optoelectronic assembly according to a fifth embodiment of the invention.

FIG. 5A shows a schematic cross-section of an optoelectronic assembly according to a fifth embodiment of the invention. This embodiment is substantially identical to that shown in FIG. 1A. Corresponding component parts, which for all intents and purposes are the same, will also retain the reference numerals previously used in FIGS. 1A and 1C (cf. numerals 1-9, 13-17).

Figure 5B:
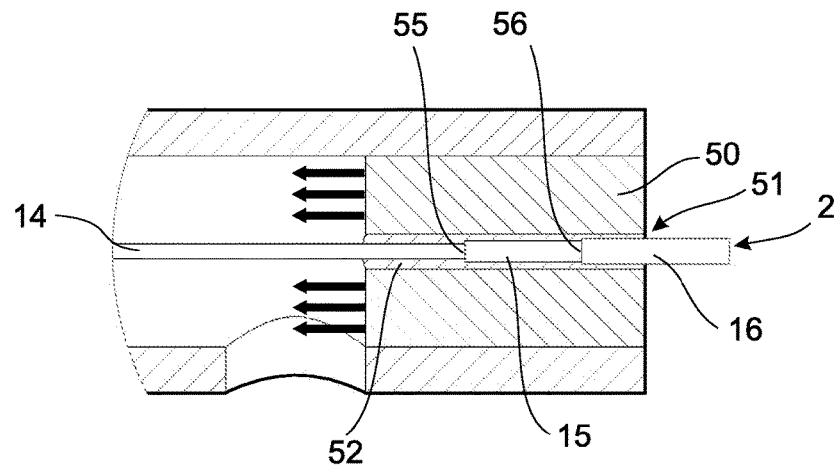
FIG. 5B shows a partial enlargement of the assembly in FIG. 5A.

FIG. 5B shows a partial enlargement of the assembly in FIG. 5A.

According to this example, the optical fiber 2 passes through and is fixed in a predetermined location in an opening 51 in a termination part 50 by a guiding glue 52. The termination part 50 acts as a reflector, being in direct contact with the coolant in the cavity 4, in order to reflect light striking the termination part 50 back into the coolant and to avoid heating of the guiding glue 52. The reflection of light is indicated by the arrows R. The termination part 50 comprises a light reflecting and heat conducting material, such as gold, copper or a copper alloy. An end portion of the guiding glue 52 is exposed to the coolant in the cavity 4 at the inner end wall of the termination part 50 and is also cooled by direct contact with the coolant.

In this context, the heat to be transferred out of the assembly is generated by the termination of the optical fiber. In FIG. 5B the jacket layer 16 is terminated at a first termination point 56 within the guiding glue 52, while the buffer layer 15 is terminated at a second termination point 55 inside the guiding glue 52. The cladding layer 14 surrounding the core extends up to the window 7.

Figure 6A:
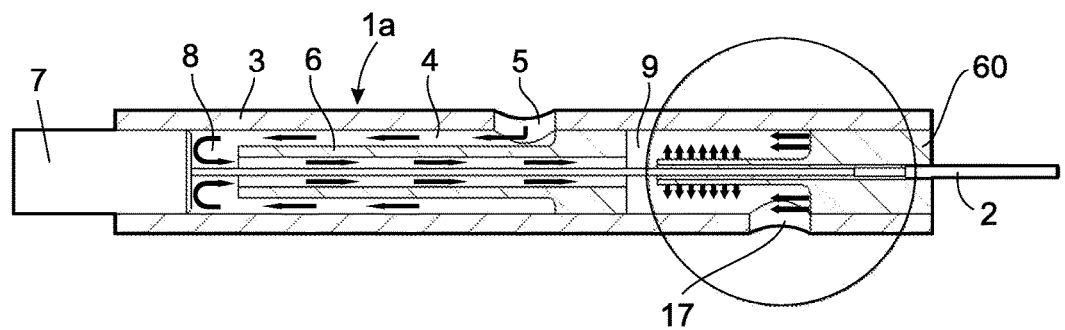
FIG. 6A shows a schematic cross-section of an optoelectronic assembly according to a sixth embodiment of the invention.

FIG. 6A shows a schematic cross-section of an optoelectronic assembly according to a sixth embodiment of the invention. This embodiment is substantially identical to that shown in FIG. 2A, wherein the termination part comprises a cylindrical portion extending into the cavity. Corresponding component parts, which for all intents and purposes are the same, will also retain the reference numerals previously used in FIGS. 1A and 1C (cf. numerals 1-9, 13-17).

Figure 6B:
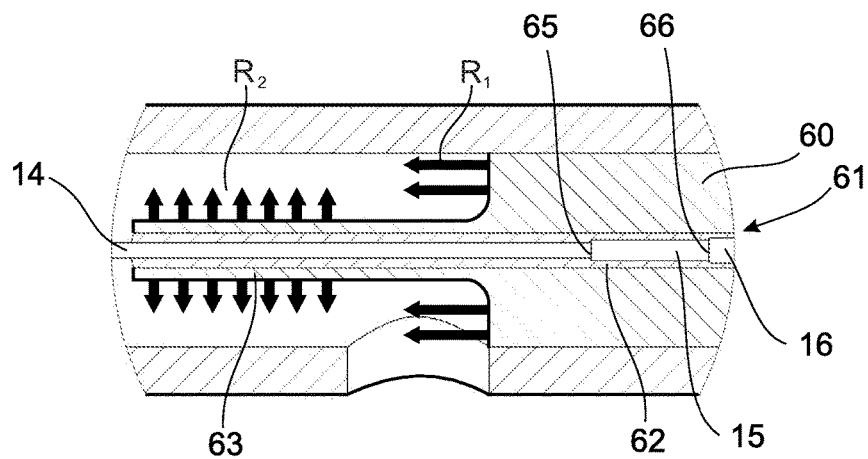
FIG. 6B shows a partial enlargement of the assembly in FIG. 6A.

FIG. 6B shows a partial enlargement of the assembly in FIG. 6A.

According to this example, the optical fiber 2 passes through an opening 61 in a termination part 60 and a cylindrical portion 63 extending a predetermined distance from the surface of the termination part 60 facing into the cavity 4. The optical fiber 2 is fixed in a predetermined location in the termination part 60 and the cylindrical portion 63 by a guiding glue 62. The termination part 60 and the cylindrical portion 63 act as reflectors, being in direct contact with the coolant in the cavity 4, in order to reflect light back into the coolant and to avoid heating of the guiding glue 62. The reflection of light is indicated by the arrows $R_1$ and $R_2$ for the termination part 60 and the cylindrical portion 63, respectively. This arrangement prevents the termination part 60, the cylindrical portion 63 and the guiding glue 62 from being heated by light that has leaked out into the cavity 4. The termination part 60 and the cylindrical portion 63 comprise a material that has good reflective and heat conducting properties, such as gold, copper or a copper alloy. An end portion of the guiding glue 62 is exposed to the coolant in the cavity 4 at the inner end wall of the termination part 60 and is also cooled by direct contact with the coolant.

In this context, the heat to be transferred out of the assembly is generated by light leaking out of the fiber in the coolant cavity and/or by light that has leaked out of the cladding layer within the termination part. In FIG. 6B the jacket layer 16 is terminated at a first termination point 66 within the guiding glue 62, while the buffer layer 15 is terminated at a second termination point 65 inside the guiding glue 62. The cladding layer 14 surrounding the core extends up to the window 7. Heat is conducted from the cylindrical portion 63 to the termination part 60 through the heat conducting material. The entire component 60, 63 is then cooled by the coolant.

Figure 7A:
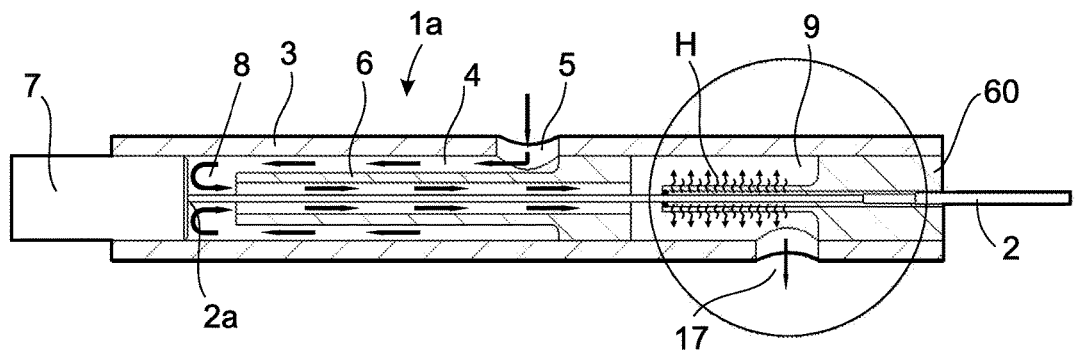
FIG. 7A shows a schematic cross-section of an optoelectronic assembly according to a seventh embodiment of the invention.

FIG. 7A shows a schematic cross-section of an optoelectronic assembly according to a seventh embodiment of the invention. This embodiment is substantially identical to that shown in FIG. 6A, wherein the termination part comprises a cylindrical portion extending into the cavity. Corresponding component parts, which for all intents and purposes are the same, will also retain the reference numerals previously used in FIGS. 1A and 1C (cf. numerals 1-9, 13-17).

Figure 7B:
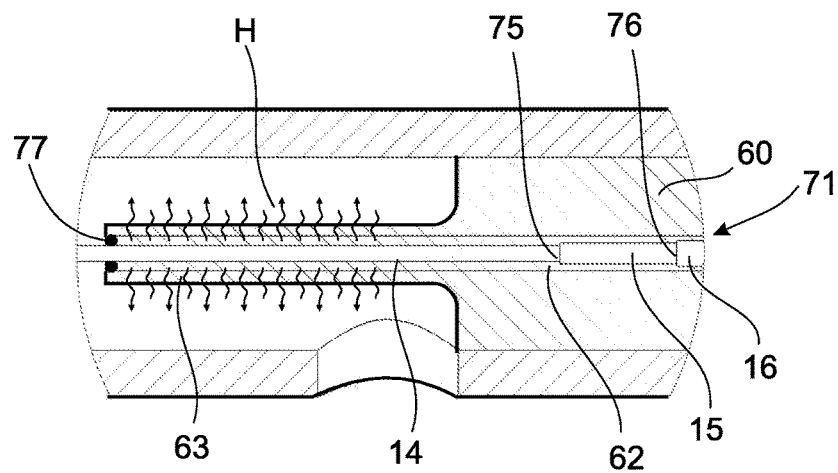
FIG. 7B shows a partial enlargement of the assembly in FIG. 7A.

FIG. 7B shows a partial enlargement of the assembly in FIG. 7A. As shown in FIG. 7B, the optical fiber 2 passes through an opening 71 in a termination part 60 and a cylindrical portion 63 extending a predetermined distance from the surface of the termination part 60 facing into the cavity 4. The optical fiber 2 is fixed in a predetermined location in the termination part 60 and the cylindrical portion 63 by a guiding glue 62. The termination part 60 and the cylindrical portion 63 act as reflectors, as described in connection with FIG. 6B above. In addition, the termination part 60 and the cylindrical portion 63 are in direct contact with the coolant in the cavity 4, in order to transfer heat to the coolant and to cool the guiding glue 62. This assists in cooling the termination part 60, the cylindrical portion 63 and in particular the guiding glue 62, which can be heated by light that has leaked out of the cladding within the termination part 60. The termination part 60 and the cylindrical portion 63 comprise a heat conducting material, such as gold, copper or a copper alloy.

The reflector designs described above allows the guiding glue to be efficiently cooled when it is exposed to heat generated from the termination of the optical fiber. The reflectivity of the reflector surface is selected sufficiently high to avoid absorption of any laser light.

The end portion of the guiding glue 62 is provided with a sealing 77 extending between the optical fiber 2 and the cylindrical portion 63. The sealing 77 is exposed to the coolant in the cavity 4 at the end of the cylindrical portion 63 and prevents coolant from reaching of the guiding glue 62 surrounding the optical fiber 2 and assists in sealing the housing. In this way, the end portion of the guiding glue 62 is not in direct contact with the coolant by means of the sealing 77. The sealing 77 comprises a suitable elastomeric material, such as a rubber material. If the opening surrounding the optical fiber is circular, the sealing 77 can be an O-ring.

Alternatively, a sealing extending between the optical fiber and a termination part as shown in FIG. 5A can be located between the guiding glue and the cooling chamber. Hence, the sealing can be placed around the optical fiber where it enters the termination part (FIG. 5A) or where it enters the cylindrical reflector (FIG. 7A).

In FIG. 7B the jacket layer 16 is terminated at a first termination point 76 within the guiding glue 62, while the buffer layer 15 is terminated at a second termination point 75 within the guiding glue 62. The cladding layer 14 surrounding the core extends up to the window 7. Heat, indicated as H in FIGS. 7A and 7B, is conducted from the cylindrical portion 63 to the termination part 60 through the heat conducting material.

FIG. 8A shows a schematic cross-section of an optoelectronic assembly according to an eight embodiment of the invention. This embodiment is substantially identical to that shown in FIG. 2A, wherein the termination part comprises a cylindrical portion extending into the cavity. Corresponding component parts, which for all intents and purposes are the same, will also retain the reference numerals used in FIGS. 1A and 1C (cf. numerals 1-9, 13-17).

FIG. 8B shows a partial enlargement of the assembly in FIG. 8A.

According to this example, the optical fiber 2 passes through an opening 81 in a termination part 80 and a cylindrical portion 83 extending a predetermined distance from the surface of the termination part 80 facing into the cavity 4. The optical fiber 2 is fixed in a predetermined location in the termination part 80 and the cylindrical portion 83 by a guiding glue 82. The termination part 80 and the cylindrical portion 83 comprise a suitable transparent material, such as glass or quartz, and are in direct contact with the coolant in the cavity 4. As such transparent materials are poor heat conductors, light that has leaked into the coolant cavity 4 will be transferred through the termination part 80 as indicated by the arrows $T_1$, $T_2$ in the figure. In this example, the jacket layer 16 is terminated at a first termination point 86 within the guiding glue 82, while the buffer layer 15 is terminated at a second termination point 85 inside the guiding glue 82. The cladding layer 14 surrounding the core extends up to the window 7.

According to an alternative example, the buffer layer can be terminated at a second termination point a predetermined distance into the coolant cavity, as shown in FIG. 4B. As described above, this prevents heating of the guiding glue within the termination part and the cylindrical portion, In this way, light leaving the optical fiber 2 at the second termination point 85 can be transmitted to the coolant through the cylindrical portion in order to transfer heat to the coolant and to cool the guiding glue 82 as indicated by arrows $T_2$. The termination part 80 also comprises a transparent material and light can be transmitted out of the assembly through this part as indicated by the arrows $T_1$. The termination part is also in contact with and cooled by the coolant. An end portion of the guiding glue 82 is exposed to the coolant in the cavity 4 at the end of the cylindrical portion 83 and is also cooled by direct contact with coolant.

Figure 9A:
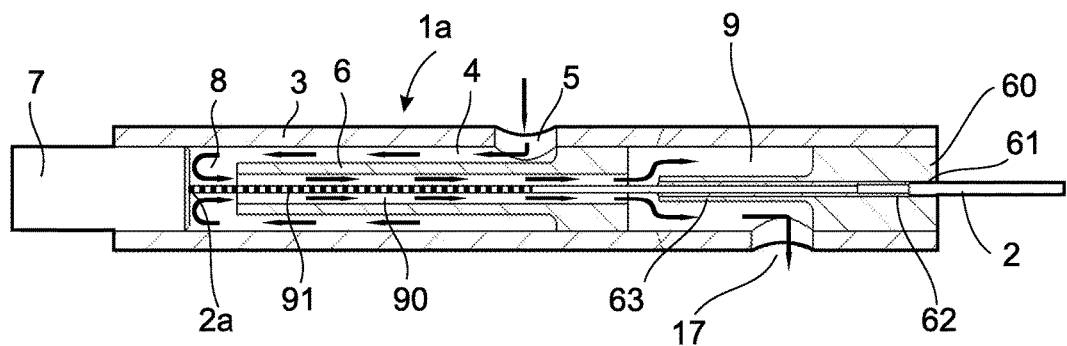
FIG. 9 shows a schematic cross-section of an optoelectronic assembly according to a ninth embodiment of the invention.

FIG. 9A shows a schematic cross-section of an optoelectronic assembly according to a ninth embodiment of the invention. This embodiment is substantially identical to that shown in FIG. 6A, wherein the termination part 60 comprises a cylindrical portion 63 extending into the cavity 4. Corresponding component parts, which for all intents and purposes are the same, will also retain the reference numerals used in FIGS. 1A and 1C (cf. numerals 1-9, 13-17).

Figure 9B:
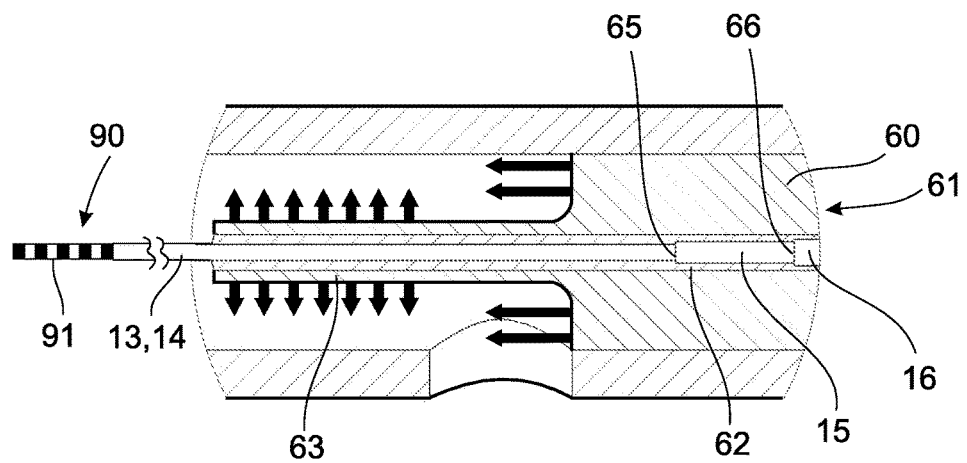

FIG. 9B shows a partial enlargement of the assembly in FIG. 9A. The example shown in FIG. 9B combines the example in FIG. 6A with a mode stripper 90 to remove cladding modes. As schematically indicated in FIGS. 9A and 9B, the optical fiber 2 comprises at least a core 13, a cladding layer 14, a buffer layer 15 and an outer jacket layer 16. In this example, the jacket layer 16 is terminated at a first termination point 66 and the buffer layer 15 is terminated at a second termination point 65 inside the guiding glue 62 while the core and the cladding 14 extends through the cavity 4 to the transparent window 7. Cladding modes are suppressed by a mode stripper section 91 that will scatter the light as it strikes the interface. This is achieved by surface roughening at least a portion of the optical fiber 2, from the transparent window 7 towards the termination part 60, causing the cladding light to scatter. This technique is called mode stripping.

The invention is not limited to the above embodiments, but may be varied freely within the scope of the claims. For instance, the optical fiber used can comprise fewer or more layers than those described in the above figures. Further, when a buffer and a jacket layer are used these layers need not be terminated at the same location, as indicated in FIG. 9B. It is also possible to combine features from the above embodiments. For instance, the reflector encircling the optical fiber adjacent the cavity in FIG. 7B can also be used for other embodiments.

In addition, the above embodiments describe a housing that comprises a transparent window located at a first end of the coolant cavity. Within the scope of the claims, it is also possible to provide the first end of the cavity with a transparent disc or a metal disc having an aperture for the fiber. The fiber can be fixed to such discs using suitable methods, as described above.

The invention claimed is:

1. An optoelectronic assembly for connectorizing an optical fiber, the assembly comprising:
    a housing with an axially extending cavity, the cavity comprising a first end where light is transmitted into the assembly and a second end where light is transmitted out of the assembly;
    a termination part located at the second end of the cavity, wherein the cavity forms a cooling chamber being fed by a flowing coolant surrounding an envelope surface of said optical fiber, wherein the optical fiber extends out of the assembly through the termination part, and
    a guiding glue configured to fix the optical fiber in the termination part, wherein the guiding glue has a lower refractive index than the envelope surface of the optical fiber in contact with the guiding glue.

2. The assembly according to claim 1, wherein the guiding glue is optically transparent or semi-transparent for wavelengths of transmitted light.

3. The assembly according to claim 1, wherein the guiding glue forms a coolant seal in the termination part.

4. The assembly according to claim 1, wherein the guiding glue is arranged to fix the optical fiber in the termination part out of contact with the termination part.

5. The assembly according to claim 1, wherein the optical fiber comprises a core, at least one cladding layer and at least one jacket layer, wherein the jacket layer is terminated within the guiding glue.

6. The assembly according to claim 5, wherein the optical fiber comprises at least one buffer layer in contact with the jacket layer.

7. The assembly according to claim 6, wherein the buffer layer is terminated within the guiding glue.

8. The assembly according to claim 7, wherein the buffer layer is terminated a predetermined distance inside the cavity.

9. The assembly according to claim 1, wherein the guiding glue comprises at least one of silicone, acrylic high-polymer, acrylate resin, and epoxy resin.

10. The assembly according to claim 1, wherein the guiding glue is at least partially located in a hollow portion of the assembly extending from the termination part into the cavity.

11. The assembly according to claim 10, wherein the hollow portion is an integral part of the termination part.

12. The assembly according to claim 10, wherein the hollow portion comprises a cylindrical reflector extending from the termination part into the cavity.

13. The assembly according to claim 10, wherein the hollow portion comprises a light reflecting and heat conducting material.

14. The assembly according to claim 1, further comprising:
    a sealing extending between the optical fiber and the termination part, wherein the sealing is located between the guiding glue and the cooling chamber.

15. The assembly according to claim 10, wherein at least the hollow portion comprises a transparent material.

16. The assembly according to claim 1, wherein a portion of the cladding layer extending through the cavity between the window and the termination part comprises a mode stripper.

17. The assembly according to claim 1, further comprising:
    a transparent window located at the first end of the cavity, wherein the optical fiber is in optical contact with the window (7).

18. The assembly according to claim 13, wherein the light reflecting and heat conducting material comprises at gold, copper or a copper alloy.

19. The assembly according to claim 15, wherein the transparent material comprises quartz, fused silica, glass, sapphire or a transparent glass material.

* * * * *